US012774175B2

(12) United States Patent
Kempf

(10) Patent No.: US 12,774,175 B2
(45) Date of Patent: Oct. 27, 2026

(54) TRANSPORT SYSTEM

(71) Applicant: Schneider Electric Industries SAS, Rueil-Malmaison (FR)

(72) Inventor: Johannes Kempf, Großheubach (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 577 days.

(21) Appl. No.: 18/214,578

(22) Filed: Jun. 27, 2023

(65) Prior Publication Data

US 2024/0182087 A1 Jun. 6, 2024

(30) Foreign Application Priority Data

Jul. 1, 2022 (EP) .................................... 22305972

(51) Int. Cl.

*B65G 54/02* (2006.01)
*B61B 13/12* (2006.01)
(Continued)

(52) U.S. Cl.

CPC .............. *B65G 54/02* (2013.01); *B61B 13/12* (2013.01); *B61J 99/00* (2013.01); *B65G 21/2072* (2013.01)

(58) Field of Classification Search

CPC .... B65G 54/02; B65G 21/2072; B65G 35/00; B61B 13/12; B61J 99/00; E01B 25/34; B60L 13/10

See application file for complete search history.

(56) References Cited

U.S. PATENT DOCUMENTS 5,033,870 A * 7/1991 Neubauer ........... F16C 29/0645 384/41
10,336,559 B2 * 7/2019 Koga ..................... B65G 54/02
(Continued)

FOREIGN PATENT DOCUMENTS

CN 108631540 A * 10/2018 .............. B60L 13/03
CN 113914156 A * 1/2022 .............. B60L 13/10
(Continued)

OTHER PUBLICATIONS

European Search Report and Search Opinion dated Dec. 14, 2022 for corresponding European Patent Application No. 22305972.6, 8 pages.

*Primary Examiner* — Cheng Lin

(74) *Attorney, Agent, or Firm* — Wolf, Greenfield & Sacks, P.C.

(57) ABSTRACT

A transport system, in particular a multi-carrier system, comprises a plurality of linear motors, which are arranged in a row and have at least one guide rail that defines a path, and at least one transport element that can be moved by the linear motors in a first direction along the path. The guide rail has a guide structure, which cooperates with the transport element, for guiding the movement of the transport element in the first direction and for absorbing forces acting on the transport element transversely to the first direction. The guide structure is at least partly interrupted at at least one transfer point along the path so that a movement of the transport element is enabled in a second direction orthogonal to the first direction and the transport element can be moved by the guide rail and/or the linear motors for a transfer from the path to a secondary path or to a placement rail in the second direction.

20 Claims, 2 Drawing Sheets

Figure 1:
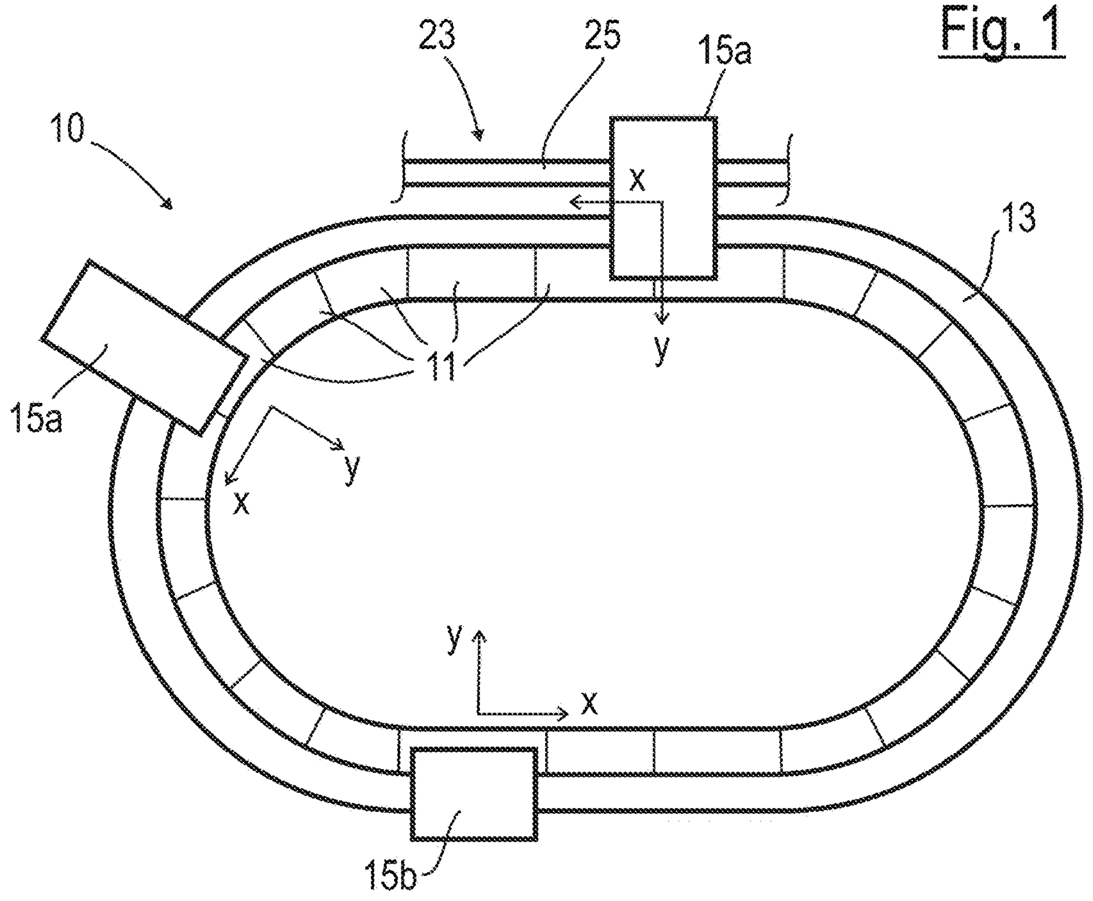

(51) Int. Cl.
*B61J 99/00* (2006.01)
*B65G 21/20* (2006.01)

(56) References Cited

U.S. PATENT DOCUMENTS

| | | | | |
|---|---|---|---|---|
| 10,781,854 | B2 * | 9/2020 | Neufeld | B65G 54/02 |
| 2019/0009990 | A1 * | 1/2019 | Nara | B65G 35/06 |
| 2019/0077277 | A1 * | 3/2019 | Holzleitner | H02P 25/064 |
| 2021/0300693 | A1 | 9/2021 | Lee et al. | |

FOREIGN PATENT DOCUMENTS

| | | | | | |
|---|---|---|---|---|---|
| DE | 29811906 | U1 | | 11/1998 | |
| DE | 102016212227 | A1 | | 1/2018 | |
| DE | 102016222806 | B3 | | 4/2018 | |
| EP | 0418875 | A2 | | 3/1991 | |
| EP | 2977628 | A1 | | 1/2016 | |
| EP | 3457560 | A1 | | 3/2019 | |
| EP | 3489175 | A1 | * | 5/2019 | B60L 13/03 |
| KR | 20220006317 | A | * | 1/2022 | H01L 21/67724 |
| KR | 20220040927 | A | * | 3/2022 | H01L 21/67196 |
| WO | 0012176 | A1 | | 3/2000 | |
| WO | WO-2021097806 | A1 | * | 5/2021 | B65G 54/02 |

* cited by examiner

TRANSPORT SYSTEM

CROSS-REFERENCE TO RELATED APPLICATION

This application claims priority to and the benefit under 35 U.S.C. § 119(d) of European Application Serial No. 22305972.6, filed on Jul. 1, 2022, which is hereby incorporated herein by reference in its entirety.

The invention relates to a transport system, in particular a multi-carrier system, and a method for transferring a transport element from a path of a transport system to a secondary path or to a placement rail.

Transport systems, i.e. in particular multi-carrier systems, preferably comprise a large number of transport elements, so-called runners, movers or carriers, that are moved by a plurality of linear motors arranged along a guide track or a path. The transport elements are in this respect movable individually and independently of one another so that multi-carrier systems provide the possibility of being flexibly adapted to different industrial processes and can in particular also react flexibly to changes in an industrial process.

The linear motors are usually provided with rails to enable and to guide the movement of the transport elements in their direction of movement, i.e. along the path, on the one hand, but, on the other hand, to fix the transport elements with some play transversely to the direction of movement, i.e. usually in a transverse direction and an upward or downward direction. However, this fixing of the transport elements makes it difficult to add or remove transport elements into or from the transport system, in particular when the transport system is currently actively in operation.

It is an object of the present invention to simplify the addition or removal of transport elements into or from the transport system—in particular also in ongoing operation.

This object is satisfied by the subjects of the independent claims. Advantageous further developments are the subject of the dependent claims and result from the description and the drawings.

The transport system in accordance with the invention is in particular a multi-carrier system and comprises a plurality of linear motors, which are also designated as stators, which are arranged in a row and which have at least one guide rail that defines a path, and at least one transport element that can be moved by the linear motors in a first direction along the path, wherein the guide rail has a guide structure, which cooperates with the transport element, for guiding the movement of the transport element in the first direction and for absorbing forces acting on the transport element transversely to the first direction, and wherein the guide structure is at least partly interrupted at at least one transfer point along the path so that a movement of the transport element is enabled in a second direction orthogonal to the first direction and the transport element can be moved in the second direction by the guide rail and/or the linear motors for a transfer from the path to a secondary path or to a placement rail.

In the transport system, it can in particular also be possible that a plurality of transport elements are simultaneously moved in the second direction by the guide rail and/or the linear motors for a transfer from the path to the secondary path or to the placement rail.

The transport system, i.e. the path, can in particular be designed as revolving, i.e. the linear motors form a self-contained path along which the transport elements, also designated as carriers, movers or runners, can theoretically be moved endlessly in the same direction. The transport element or the transport elements are in particular magnetically driven in this respect. For this purpose, the transport elements have one or more permanent magnets that are acted on by a driving force by means of a changing and/or wandering magnetic field that is generated by the linear motors. The driving force leads to a movement of the transport elements along the guide track. Workpieces can thereby, for example, be transported along the guide track by means of the transport elements. A plurality of transport elements can preferably be simultaneously arranged on the path and can in particular be moved independently and separately of one another.

The terms "first direction", "second direction" and "third direction" refer to a co-moving coordinate system of a respective transport element whose coordinate origin can in particular lie at the center of gravity of the transport element. The first direction in this respect corresponds to the direction of movement of the transport element. The second direction is defined as orthogonal to the first direction, while the third direction, still mentioned below, is orthogonal to both the first direction and the second direction. The first, second and third direction thus in particular correspond to the directions of the three axes of the Cartesian co-moving coordinate system. If the transport element is moved horizontally, the second direction can in particular correspond to a vertical. The third direction, for example, corresponds to a transverse direction of the transport element and is then towards the linear motors or away from them. In the co-moving coordinate system, the first direction, for example, corresponds to the x direction, the second direction corresponds to the z direction, and the third direction corresponds to the y direction.

The guide structure in particular refers to shapes of any kind of the guide rail or a part thereof that are suitable for acting on the transport elements such that the movement of the transport elements along the path is enabled, but movements of the transport element transverse to the first direction, i.e. within a plane with respect to which the direction of movement is a normal, are prevented. This takes place in that corresponding forces acting on the transport element are absorbed by the guide structure. The guide structure can, for example, be formed by geometric shapes such as grooves, projections, or angles.

In order, in particular in ongoing operation, to facilitate and to better automate the addition or removal of transport elements into or from the transport system, the guide structure is at least partly interrupted at the transfer point in the sense that a movement of the transport element is enabled in at least the second direction. The transport element can then therefore be moved in a direction orthogonal to the direction of movement, for example in the vertical direction. The transport element can then in particular be moved vertically to the guide rail or a part thereof. The movement in the second direction is advantageous to take the transport element down from the guide rail in order, for example, to be able to transfer it to an adjacent path, also designated as a secondary path in the following, or to a placement rail. On the other hand, due to the interruption of the guide structure, additional transport elements can also be added, i.e. fed to the path.

The guide rail preferably has at least one main guide rail for absorbing forces in the second direction by means of the guide structure and at least one transfer guide rail for absorbing forces in the second direction by means of the guide structure, with the guide structure of the main guide rail being interrupted at the transfer point. If, as in this case, the guide rail therefore has a plurality of part rails that together form the guide structure, it can therefore be sufficient if only the guide structure of one part rail, i.e. here the main guide rail, is interrupted. To enable a movement of the transport element in the second direction, the transfer guide rail then contributes to this movement, as will be discussed further later.

At least one of the main guide rail and the transfer guide rail can be configured to absorb forces in the third direction, which is orthogonal to the first direction and the second direction, by means of the guide structure. In particular if the third direction is the transverse direction, this can contribute towards preventing a lateral falling out. This corresponds to a further safety measure in addition to the attractive force of the magnetic field of the linear motors.

The transfer guide rail can be movable or inclinable at least at the transfer point for moving the transport element in the second direction. The transfer guide rail then contributes to the movement of the transport element in the second direction. This can in particular be fully automated, if necessary, so that an automated removal of the transport element from the path is possible in that the transfer guide rail, for example, raises the transport element to a level different from the path or lowers it from said level. The transport element is preferably brought to a level that corresponds to the secondary path or the placement rail so that the transport element can be transferred in an automated manner to said secondary path or placement rail.

The transport system can in particular have the secondary path, which is arranged at the transfer point and defined by a secondary guide rail, or the placement rail.

The placement rail can, for example, be configured to be arranged or positioned at the transfer point, for example by means of a gripper arm.

The secondary guide rail can—corresponding to the transfer guide rail—have a pick-up guide rail that can be moved or inclined in the second direction. Thus, in particular an "acceptance" of the transport element moved in the second direction is possible. The transfer guide rail and the pick-up guide rail can preferably cooperate so that the transfer guide rail "indicates" the transport element and the pick-up guide rail "accepts" the transport element. The travel times of the transfer guide rail can in particular hereby be shortened so that the transfer guide rail is back in its operational position more quickly and any subsequent transport elements on the path can move into or pass the transfer point.

The transport element is provided with running elements that cooperate with the guide structure to effect the guidance of the transport elements along the direction of movement. All the running elements of a transport element can in particular be arranged at a side of the transport element facing the guide rail, which corresponds to an asymmetrical design of a transport element.

The method in accordance with the invention serves to transfer a transport element from a path defined by a guide rail of a transport system to a secondary path or to a placement rail. The transport system has a plurality of linear motors, which are arranged in a row and comprise the guide rail, and the transport element that can be moved by the linear motors in a first direction along the path. The guide rail has a guide structure, which cooperates with the transport element, for guiding the movement of the transport element in the first direction and for absorbing forces acting on the transport element transversely to the first direction.

The guide structure is at least partly interrupted at at least one transfer point along the path so that a movement of the transport element in a second direction orthogonal to the first direction is enabled and the transport element can be moved in the second direction for a transfer from the path to the secondary path or to the placement rail. The method comprises the steps:

- moving the transport element in the first direction to the transfer point, and
- moving the transport element in the second direction to transfer the transport element to the secondary path or to the placement rail.

The method therefore provides the transfer of the transport element by moving the transport element in the second direction. For this purpose, the guide structure is at least partly interrupted so that the movement of the transport element is made possible in the first place. This in particular enables the removal of the transport element from the path in ongoing operation.

The transport element is preferably moved in the second direction by the guide rail and/or the linear motors so that in particular an automated removal of the transport element is possible without an operator having to manually intervene.

The guide rail preferably has a transfer guide rail that can be moved or inclined in the second direction at least at the transfer point, wherein the method further comprises that the transfer guide rail is moved or inclined at least at the transfer point for moving the transport element in the second direction. Thus, an automated movement in the second direction takes place to raise or lower the transport element to or from a level that is different from the level of the path.

The transport element can be moved in the first direction after the movement in the second direction in order to enter into guiding engagement with a secondary guide rail of the secondary path or with the placement rail. The movement can, for example, take place by linear motors of the secondary path or of the placement rail, i.e. magnetically, or by another force effect. This therefore corresponds to a movement in parallel with the direction of movement of the path after the transport element has, for example, been raised or laterally offset. This can be advantageous if, for instance, the placement rail extends at least partly in parallel with the path.

The secondary guide rail can have a pick-up guide rail that can be moved or inclined in the second direction, with the method further comprising moving or inclining the pick-up guide rail to take over the transport element. Thus, an "acceptance" of the transport element moved in the second direction is in particular possible. The transfer guide rail and the pick-up guide rail can preferably cooperate so that the transfer guide rail "indicates" the transport element and the pick-up guide rail "accepts" the transport element.

The placement rail is preferably positioned at the transfer point or is moved away from the transfer point, in particular by means of a gripper arm. In this respect, it is in particular conceivable that a gripper arm positions the placement rail there, in particular in parallel with the path, the transport element is then transferred from the path to the placement rail, and the placement rail is subsequently moved away by the gripper arm.

In all other respects, the statements made about the transport system in accordance with the invention apply accordingly to the method in accordance with the invention.

Figure 2:
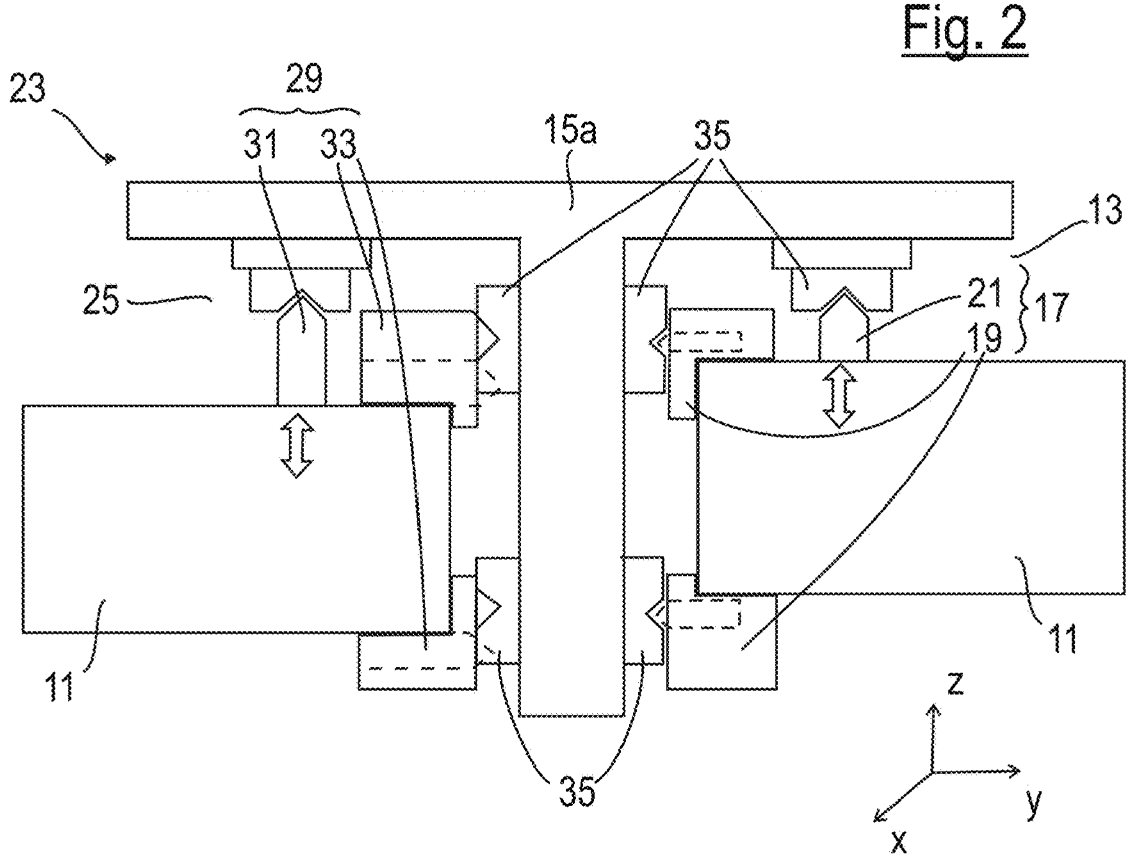
Figure 3:
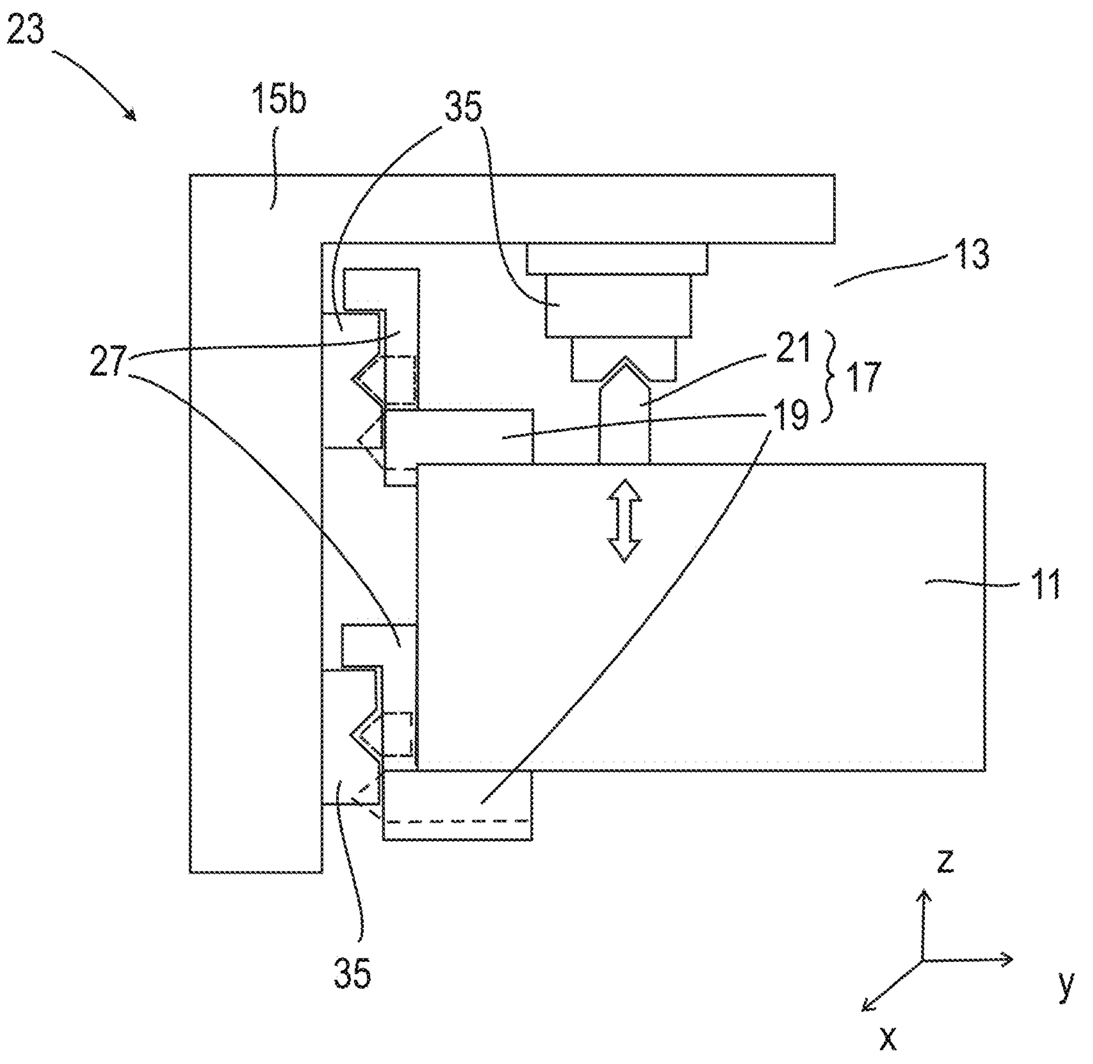

In the following, the invention will be described schematically and by way of example with reference to the drawings. It is shown therein:

FIG. 1 a plan view of a multi-carrier system;

FIG. 2 a cross-sectional view of a transfer point at which a transport element is transferred from a path to a secondary path; and FIG. 3 a cross-sectional view of a transfer point at which a transport element is transferred from a path to a placement rail.

In FIG. 1, a transport system 10 that is configured as a multi-carrier system is shown in a plan view. The transport system 10 has a plurality of linear motors 11 that are arranged in a row and that form a revolving path 13 in the present example. Along the path 13, in this example, three carriers or transport elements 15*a*, 15*b* are arranged that are magnetically driven by the linear motors 11 due to a changing or wandering magnetic field and that can thereby be moved independently and separately from one another. In this respect, two transport elements 15*a* are formed symmetrically, as shown in cross-section in FIG. 2. The third transport element 15*b*, on the other hand, is formed asymmetrically, as shown in cross-section in FIG. 3.

In FIG. 1, the transport elements 15*a*, 15*b* are each associated with a co-moving coordinate system. In this respect, the x direction corresponds to the direction of movement, i.e. the direction of a velocity vector of the transport element 15*a*, 15*b*. The y direction is a transverse direction, orthogonal to the x direction. In the present embodiments, the x direction and the y direction lie in a horizontal plane. The z direction can be recognized in the cross-sectional views in accordance with FIGS. 2 and 3 and corresponds to the remaining direction of the Cartesian co-moving coordinate system.

By way of example, FIG. 1 furthermore shows a secondary path 25, of which a section is shown that extends in parallel with the path 13 adjacent to a transfer point 23 of the path 13. The secondary path 25 is arranged in the region of the transfer point 23 such that the symmetrically formed transport elements 15*a* cover the secondary path 25 in the present embodiment, as can also be seen from the cross-sectional view in FIG. 2. In FIG. 2, on the one hand, a linear motor 11 of the path 13 is shown at the right and, on the other hand, a further linear motor 11 of the secondary path 25 is shown at the left. The linear motors 11 of the path 13 are provided with a guide rail 17 that has main guide rails 19 and a transfer guide rail 21 in the present embodiment. Accordingly, the linear motors 11 of the secondary path 35 are provided with a secondary guide rail 29 that has a pick-up guide rail 31 and rails 33 in the present embodiment.

The guide rails 17, 29 have a guide structure schematically indicated in FIG. 2 and shown partly dashed. In this respect, guide structure refers to those structural features that engage into running elements 35 of the transport element 15*a* and cooperate with the running elements 35 such that the transport element 15*a* can be moved along the guide structure in the x direction, but forces in the y direction and the z direction are absorbed by the guide structure and movements of the transport element 15*a* away from the guide rail 17, 29 are thus prevented. The transport element 15*a* is thereby securely held at the respective guide rail 17, 29.

Before the transport element 15*a* moves into the transfer point 23, it is guided by the guide structures of the main guide rails 19 (shown dashed) and of the transfer guide rail 21. In the region of the transfer point 23, the guide structure of the main guide rails 19 is interrupted to the extent that the main guide rails 19 indeed still absorb forces in the y direction, but no longer in the z direction. The guide structure of the transfer guide rail 21, on the other hand, is not interrupted. A movement of the transport element 15*a* in the z direction thus becomes possible.

As indicated in FIG. 2, the guide structures of the rails 33 of the secondary path 25 are likewise interrupted in the region of the transfer point 23, whereas the guide structure of the pick-up guide rail 31 is not interrupted. As furthermore indicated in FIG. 2, the rails 33 and their guide structure are vertically offset from the main guide rails 19 along the z direction. To transfer the transport element 15*a* from the path 13 to the secondary path 25, the transport element 15*a* therefore has to be moved along the z direction so that the running elements 35 can be brought into engagement with the guide structure of the rails 33. In the present embodiment, this takes place by moving the transfer guide rail 21 in the z direction, as indicated by an arrow in FIG. 2, until the transport element 15*a* has reached the level of the secondary path 25. If this does not happen, the transport element 15*a* remains on the path 13. Additionally or alternatively, it is also conceivable that the pick-up guide rail 31 is moved in the z direction. Furthermore, it is also conceivable that the rails 21, 31 are not moved, but are inclined.

After the transport element 15*a* has reached the level of the secondary path 35, it can be transferred to the secondary path 35 by bringing its running elements 35 into engagement with the secondary guide rail 29. This can in particular take place through a driving by the linear motors 11 of the secondary path 35.

A further possible application can be seen from FIG. 3 that illustrates the transfer of a transport element 15*b* to a placement rail 27 instead of a secondary path. The basic mode of operation corresponds to the mode of operation described above so that not all the details will be presented again in the following, but only deviations will be explained separately.

In FIG. 3, guide structures of both the main guide rail 19 and the placement rail 27 are also shown dashed outside the transfer point 23. As can be seen from FIG. 3, the guide structures of the main guide rail 19 are interrupted in the region of the transfer point 23 such that a movement of the transport element 15*b* in the z direction is enabled. The placement rail 27 is furthermore arranged offset from the main guide rail 19 in the z direction. By moving the transfer guide rail 21 along the z direction (indicated by an arrow), the transport element 15*b* is raised so that the running elements 35 can be brought into engagement with guide structures of the placement rail 27. The transport element 15*b* can then be "parked" on the placement rail 27. Furthermore, the placement rail can, as shown in FIG. 3, be positioned or moved away by means of a gripper arm, not shown.

If, in accordance with the representation in FIG. 3, both rails are arranged at one side, it is possible to provide such an asymmetrical transport element 15*b* in which all the running elements 35 are arranged at the same side of the transport element 15*b*, namely at the side of the transport element 15*b* facing the guide rail 17 and the placement rail 27.

REFERENCE NUMERAL LIST

10 transport system
11 linear motor
13 path
15*a* transport element
15*b* transport element
17 guide rail
19 main guide rail
21 transfer guide rail
23 transfer point
25 secondary path
27 placement rail 29 secondary guide rail
31 pick-up guide rail
33 rail
35 running element

The invention claimed is:

1. A transport system comprising:

a plurality of linear motors, which are arranged in a row and have at least one guide rail that defines a path, and at least one transport element that can be moved by the linear motors in a first direction along the path, wherein the guide rail has a guide structure, which cooperates with the transport element, for guiding the movement of the transport element in the first direction and for absorbing forces acting on the transport element transversely to the first direction, wherein the guide structure is at least partly interrupted at least at one transfer point along the path so that a movement of the transport element is enabled in a second direction orthogonal to the first direction and the transport element can be moved in the second direction by the guide rail and/or the linear motors for a transfer from the path to a secondary path or to a placement rail, wherein the guide rail has at least one main guide rail for absorbing forces in the second direction by means of the guide structure and at least one transfer guide rail for absorbing forces in the second direction by means of the guide structure, with the guide structure of the main guide rail being interrupted at the transfer point, and wherein the transfer guide rail can be moved or inclined at least at the transfer point for moving the transport element in the second direction.

2. The transport system in accordance with claim 1, wherein at least one of the main guide rail and the transfer guide rail is configured to absorb forces in a third direction, which is orthogonal to the first direction and the second direction, by means of the guide structure.

3. The transport system in accordance with claim 1, wherein the secondary path is arranged at the transfer point and is defined by a secondary guide rail, or by a placement rail that is suitable for being arranged at the transfer point.

4. The transport system in accordance with claim 3, wherein the placement rail is suitable for being positioned at the transfer point or moved away from the transfer point.

5. The transport system in accordance with claim 3, wherein the secondary guide rail has a pick-up guide rail that can be moved or inclined in the second direction.

6. The transport system in accordance with claim 3, wherein the placement rail is suitable for being positioned at the transfer point or moved away from the transfer point by means of a gripper arm.

7. The transport system in accordance with claim 1, wherein the transport element is provided with running elements that cooperate with the guide structure, with all the running elements being arranged at a side of the transport element facing the guide rail.

8. A method for transferring a transport element from a path defined by a guide rail of a transport system to a secondary path or to a placement rail, wherein the transport system has a plurality of linear motors, which are arranged in a row and comprise the guide rail, and the transport element that can be moved by the linear motors in a first direction along the path, wherein the guide rail has a guide structure, which cooperates with the transport element, for guiding the movement of the transport element in the first direction and for absorbing forces acting on the transport element transversely to the first direction, and wherein the guide structure is at least partly interrupted at least at one transfer point along the path so that a movement of the transport element in a second direction orthogonal to the first direction is enabled and the transport element can be moved in the second direction for a transfer from the path to the secondary path or to the placement rail, wherein the guide rail has a transfer guide rail that can be moved or inclined in the second direction at least at the transfer point, wherein the method comprises:

moving the transport element in the first direction to the transfer point;

moving or inclining the transfer guide rail at least at the transfer point for moving the transport element in the second direction; and moving the transport element in the second direction to transfer the transport element to the secondary path or to the placement rail.

9. The method in accordance with claim 8, wherein the transport element is moved in the second direction by the guide rail and/or the linear motors.

10. The method in accordance with claim 8, wherein the transport element is moved in the first direction after the movement in the second direction in order to enter into guiding engagement with a secondary guide rail of the secondary path or with the placement rail.

11. The method in accordance with claim 10, wherein the secondary guide rail has a pick-up guide rail that can be moved or inclined in the second direction, with the method further comprising moving or inclining the pick-up guide rail to take over the transport element.

12. The method in accordance with claim 8, further comprising positioning the placement rail at the transfer point or moving the placement rail away from the transfer point.

13. The method in accordance with claim 12, further comprising positioning the placement rail at the transfer point or moving the placement rail away from the transfer point by means of a gripper arm.

14. The transport system in accordance with claim 1, wherein the transport system comprises a multi-carrier system.

15. A transport system comprising:

a plurality of linear motors, which are arranged in a row and have at least one guide rail that defines a path, and at least one transport element that can be moved by the linear motors in a first direction along the path, wherein the guide rail has a guide structure, which cooperates with the transport element, for guiding the movement of the transport element in the first direction and for absorbing forces acting on the transport element transversely to the first direction, wherein the guide rail has at least one main guide rail and at least one transfer guide rail, with the guide structure of the main guide rail being interrupted at least at one transfer point along the path so that a movement of the transport element is enabled in a second direction orthogonal to the first direction, wherein the transfer guide rail is configured to move the transport element in the second direction at the transfer point by moving or inclining relative to the path, and wherein the transport element can be transferred from the path to a secondary path or to a placement rail by the movement of the transfer guide rail in the second direction.

16. The transport system in accordance with claim 15, wherein the transfer guide rail is configured to raise or lower the transport element to a level different from the path by moving or inclining at the transfer point.

17. The transport system in accordance with claim 15, wherein the transfer guide rail is configured to bring the transport element to a level that corresponds to the secondary path or the placement rail.

18. The transport system in accordance with claim 15, wherein the transport system comprises a multi-carrier system.

19. The transport system in accordance with claim 15, wherein the secondary path is arranged at the transfer point and defined by a secondary guide rail, or by a placement rail that is suitable for being arranged at the transfer point.

20. The transport system in accordance with claim 19, wherein the secondary guide rail has a pick-up guide rail that can be moved or inclined in the second direction to take over the transport element from the transfer guide rail.

* * * * *